(12) United States Patent
Hidaka et al.

(10) Patent No.: US 8,652,983 B2
(45) Date of Patent: Feb. 18, 2014

(54) HEXAGONAL TYPE BARIUM TITANATE POWDER, PRODUCING METHOD THEREOF, DIELECTRIC CERAMIC COMPOSITION, ELECTRONIC COMPONENT, AND PRODUCING METHOD OF THE ELECTRONIC COMPONENT

(75) Inventors: Shigekazu Hidaka, Tokyo (JP); Tatsuya Ishii, Tokyo (JP); Takeo Tsukada, Tokyo (JP); Hidesada Natsui, Tokyo (JP); Kenichiro Masuda, Tokyo (JP)

(73) Assignee: TDK Corporation, Tokyo (JP)

( * ) Notice: Subject to any disclaimer, the term of this patent is extended or adjusted under 35 U.S.C. 154(b) by 183 days.

(21) Appl. No.: 13/238,697

(22) Filed: Sep. 21, 2011

(65) Prior Publication Data

US 2012/0083402 A1    Apr. 5, 2012

(30) Foreign Application Priority Data

Sep. 30, 2010  (JP) ................................ 2010-222700

(51) Int. Cl.
*C04B 35/00*         (2006.01)
(52) U.S. Cl.
USPC .......................................... 501/137; 501/139
(58) Field of Classification Search
USPC ........................ 501/134, 135, 136, 137, 139
See application file for complete search history.

(56) References Cited

U.S. PATENT DOCUMENTS

| 4,283,753 A * | 8/1981 | Burn ........................... 361/321.4 |
| 4,429,052 A | 1/1984 | Mateika et al. |
| 6,078,494 A * | 6/2000 | Hansen ........................ 361/321.5 |
| 7,087,186 B1 * | 8/2006 | Tidrow et al. ............. 252/62.9 R |
| 7,094,721 B2 * | 8/2006 | Li et al. .......................... 501/138 |
| 2005/0199180 A1 | 9/2005 | Yono et al. |
| 2006/0205095 A1 | 9/2006 | Yono et al. |
| 2007/0202036 A1 * | 8/2007 | Jongen et al. ............... 423/593.1 |
| 2011/0059838 A1 | 3/2011 | Yono et al. |
| 2011/0110017 A1 | 5/2011 | Natsui et al. |
| 2011/0110018 A1 | 5/2011 | Ishii et al. |

FOREIGN PATENT DOCUMENTS

| EP | 0 033 990 A2 | 8/1981 |
| JP | A-2002-293621 | 10/2002 |
| JP | A-2005-53726 | 3/2005 |
| JP | A-2005-213083 | 8/2005 |
| JP | A-2006-327846 | 12/2006 |
| JP | B2-3941871 | 4/2007 |
| JP | A-2011-116629 | 6/2011 |
| JP | A-2011-116630 | 6/2011 |
| WO | WO 2009/136449 A1 | 11/2009 |

OTHER PUBLICATIONS

Feteira et al; "Microwave Dielectric Properties of Gallium-Doped Hexagonal Barium Titanate Ceramics;" Communications of the American Ceramic Society; 2003; vol. 86, No. 3, pp. 511-513.

(Continued)

*Primary Examiner* — Noah Wiese
(74) *Attorney, Agent, or Firm* — Oliff PLC

(57) ABSTRACT

A hexagonal type barium titanate powder comprising barium titanate as a main component shown by a generic formula of $(Ba_{1-\alpha}M_\alpha)_A(Ti_{1-\beta}Ga_\beta)_BO_3$ and having hexagonal structure wherein;

an effective ionic radius of 12-coordinated "M" is −25% or more to +25% or less with respect to an effective ionic radius of 12-coordinated $Ba^{2+}$, and said A, B, $\alpha$ and $\beta$ satisfy relations of $0.975 < (A/B) \le 1.015$, $0.0015 \le \alpha < 0.005$, $0.075 \le \beta \le 0.15$.

5 Claims, 4 Drawing Sheets

(56) References Cited

OTHER PUBLICATIONS

Lee et al., "Investigating the Dielectric Property of Abnormal Grain Growth Hexagonal BaTiO$_3$," *Ferroelectrics*, 2009, pp. 36-41, vol. 382.

Gulwade et al., "Diffuse phase transition in La and Ga doped barium titanate," *Solid State Communications*, 2008, pp. 340-344, vol. 146.

Mar. 4, 2013 Office Action issued in Chinese Patent Application No. 201110309878.

Wang, S. et al., "Properties of Hexagonal Ba(Ti$_{1-x}$Mn$_x$)O3 Ceramics: Effects of Sintering Temperature and Mn Content," *Japanese Journal of Applied Physics*, 2007, pp. 2978-2983, vol. 46, No. 5A.

Feteira, A. et al., "Synthesis and characterization of Ga-doped hexagonal BaTiO$_3$," *Crystal Engineering 5*, 2002, pp. 439-448.

\* cited by examiner

HEXAGONAL TYPE BARIUM TITANATE POWDER, PRODUCING METHOD THEREOF, DIELECTRIC CERAMIC COMPOSITION, ELECTRONIC COMPONENT, AND PRODUCING METHOD OF THE ELECTRONIC COMPONENT

TECHNICAL FIELD

The present invention relates to a hexagonal type barium titanate powder, a producing method thereof, a dielectric ceramic composition, an electronic component and a producing method of the electronic component.

BACKGROUND ART

Recently, an electric device and an electronic device have rapidly become compact and have higher-performances. Thus, it is required in the electronic components used in said devices to improve various characteristic (a specific permittivity, and a temperature characteristics or so) while sufficiently maintaining a reliability. A ceramic capacitor as an example of the electronic components is not exception.

As the dielectric material, particularly as for the dielectric material having high specific permittivity, a tetragonal barium titanate was mainly used, and a tetragonal barium titanate including a cubic was used partially. Also, recently in order to further improve the capacity, the dielectric layer is made thinner. In order to make the dielectric layer thinner, it is preferable to have smaller particle diameter of the dielectric particle. However, when the tetragonal barium titanate powder such as mentioned in the above is pulverized, there were problems such that the specific permittivity becomes low.

As the material having high specific permittivity, the hexagonal baium titanate is being considered. The hexagonal barium titanate, in nature, has lower specific permittivity than the cubic barium titanate, however in the Patent document 1, it is described that by introducing the oxygen defect in to the hexagonal barium titanate singlecrystal, the specific permittivity can be improved significantly.

However when the present inventors started the examination based on the teaching of the above Patent document 1, even though the specific permittivity was improved by introducing the oxygen defect, it was confirmed that the dielectric resistance declines. Thus, when using the hexagonal barium titanate having a improved specific permittivity by the introduction of the oxygen defect, the element lifetime may be deteriorated.

Also, as the structure of barium titanate, the hexagonal structure is a metastable phase, and usually it can exist only at 1460° C. or above. Therefore, in order to obtain the hexagonal barium titanate under room temperature, it is necessary to rapidly cool from the high temperature of 1460° C. or above.

In such case, by rapidly cooling from the high temperature, the specific surface area of the obtained hexagonal barium titanate becomes 1 m²/g or less, and only the rough powder can be obtained. When the electronic component comprising the dielectric layer which is made thin by using such rough powder is produced, it can not manage to make the dielectric layer thinner, and thus the reliability can not ensured sufficiently.

As for the producing method of the hexagonal barium titanate, for example, the non-patent literature 1 and 2 disclose to use $BaCO_3$, $TiO_2$ and $Mn_3O_4$ (non-patent literature 1) or oxide of Ga (non-patent document 2) as the starting source material, followed by heat treating.

However, the specific surface area of the hexagonal barium titanate obtained in the non-patent literature 1 is approximately 1.6 m²/g or so, and in case of using this hexagonal barium titanate, it is insufficient to apply to a thinner dielectric layer in the electronic components even though using this hexagonal barium titanate powder. In case of the non-patent document 2, the specific surface area is not mentioned; however since the synthesis temperature is 1300° C. which is relatively high, the specific surface area is same or less than that of the non-patent literature 1. Also, the hexagonal barium titanate having further high specific permittivity is demanded.

[Patent document 1] Japanese Patent No. 3941871
[Non-patent literature 1] Properties of Hexagonal $Ba(Ti_{1-x}Mn_x)O3$ Ceramics: Effects of Sintering Temperature and Mn Content (Japanese Journal of Applied Physics, 2007, Vol. 46, No. 5A, 2978-2983)
[Non-patent literature 2] Crystal Engineering 5 (2002), 439-448

SUMMARY OF THE INVENTION

The present invention has been made by considering such situations and a purpose of the invention is to provide a hexagonal type barium titanate powder, the production method thereof, and the dielectric ceramic composition, the electronic component and the production method of the electronic component, suitable for producing the dielectric layer of the electronic component of the ceramic capacitor and the like showing comparatively high specific permittivity, having advantage insulation resistance and having sufficient reliability.

In order to achieve the above mentioned purposes, according to keen examination by the present inventors, they have found the electronic components such as ceramic capacitor and the like improving specific permittivity of the dielectric layer, having advantage insulation resistance and having sufficient reliability can be obtained by composing a main phase of the dielectric ceramic composition of hexagonal type barium titanate having specific composition so that the present invention has been completed.

Namely, a hexagonal type barium titanate powder according to the present invention includes a barium titanate as a main component shown by a generic formula of $(Ba_{1-\alpha}M_\alpha)_A(Ti_{1-\beta}Ga_\beta)_BO_3$ and having hexagonal structure wherein an effective ionic radius of 12-coordinated "M" is −25% or more to +25% or less (within ±25%) with respect to an effective ionic radius of 12-coordinated $Ba^{2+}$, and the A, B, α and β satisfy relations of $0.975 \leq (A/B) \leq 1.015$, $0.0015 \leq \alpha < 0.005$, $0.075 \leq \beta \leq 0.15$.

In the barium titanate powder according to the present invention, barium titanate powder having hexagonal structure (hexagonal barium titanate) is included as a main component. Specifically, hexagonal barium titanate may be included in a content of 50 wt % or more with respect to 100 wt % of hexagonal type barium titanate powder according to the present invention.

In the crystal structure of the barium titanate, the hexagonal structure is high temperature stable phase, and exists only at 1460° C. or higher. Therefore, in order to maintain the hexagonal structure at room temperature, it is necessary to cool rapidly from 1460° C. to near the room temperature. When it is rapidly cooled through such a wide temperature range, the hexagonal barium titanate powder obtained after the rapid cooling becomes coarse, and its specific surface area becomes, for example, 1 m²/g or less.

The specific surface area and an average particle diameter of powder are in inverse relationship, thus the specific surface area thereof is substituted in terms of the average particle diameter, it becomes, for example, 1 μm or more. On the other hand, in order to keep reliability sufficiently as electronic components, it is preferable that two or more dielectric particles are placed between the dielectric layers. Therefore, when powder having small specific surface area is used, it becomes difficult to make the dielectric layer thinner.

However, as mentioned above, in the crystal structure, the transformation temperature to hexagonal structure can be lowered by substituting a position where Ti occupies (B site) by Ga in a certain ratio. Namely, it is possible to maintain the hexagonal structure even at lower temperature than 1460° C., as a result, the specific surface area can be increased comparatively.

On the other hand, the position where Ba occupies (A site) is substituted in a predetermined ratio by element M. By comprising such element, the powder having a desired characteristic can be obtained. For example, when rare earth element such as La and the like is comprised as an element of M, significantly high specific permittivity (for example 10000 or higher) can be exhibited.

In addition to this, in the present invention, a range of an abundance ratio (A/B) of an element existing at the position where Ba occupies (A site) and an element existing at the position where Ti occupies (B site) is set as above.

By controlling the A/B as the above range, grain growth of the barium titanate particle can be suppressed. As a result, the specific surface area of the obtained hexagonal barium titanate powder can be increased further. Specifically, hexagonal barium titanate powder having 2 $m^2/g$ or more of the specific surface area can be obtained.

Also, a dielectric ceramic composition according the present invention includes a hexagonal type barium titanate as a main component shown by a generic formula of $(Ba_{1-\alpha}M_\alpha)_A(Ti_{1-\beta}Ga_\beta)_B O_3$ and having hexagonal structure wherein an effective ionic radius of 12-coordinated "M" is −25% or more to +25% or less (within ±25%) with respect to an effective ionic radius of 12-coordinated $Ba^{2+}$, and the A, B, α and β satisfy relations of $0.0975 \leq (A/B) \leq 1.015$, $0.0015 \leq \alpha \leq 0.005$, $0.075 \leq \beta \leq 0.15$.

Also, the electronic component according to the present invention comprises the dielectric layer constituted by the above mentioned dielectric ceramic composition.

The production method of the present invention comprises the steps of;
forming a dielectric paste layer using a dielectric paste including the above mentioned hexagonal type barium titanate, and
firing said dielectric paste layer.

Also, the production method of a hexagonal type barium titanate powder according to the present invention is a production method of any one of the above mentioned hexagonal type barium titanate powder comprising the steps of,
preparing a source material of barium titanate, a source material of an element M, and a source material of Ga, and
heat treating said source material of barium titanate, said source material of the element of M, said source material of Ga.

According to the present invention, the hexagonal type barium titanate and the dielectric ceramic composition which are preferable to produce dielectric layer of electronic components such as ceramic capacitor and the like showing comparatively high specific permittivity, having advantageous insulation resistance and having sufficient reliability can be obtained.

DETAILED DESCRIPTION OF THE INVENTION

Below, the present invention will be explained based on embodiments shown as follows.

(Multilayer Ceramic Capacitor)

Figure 1:
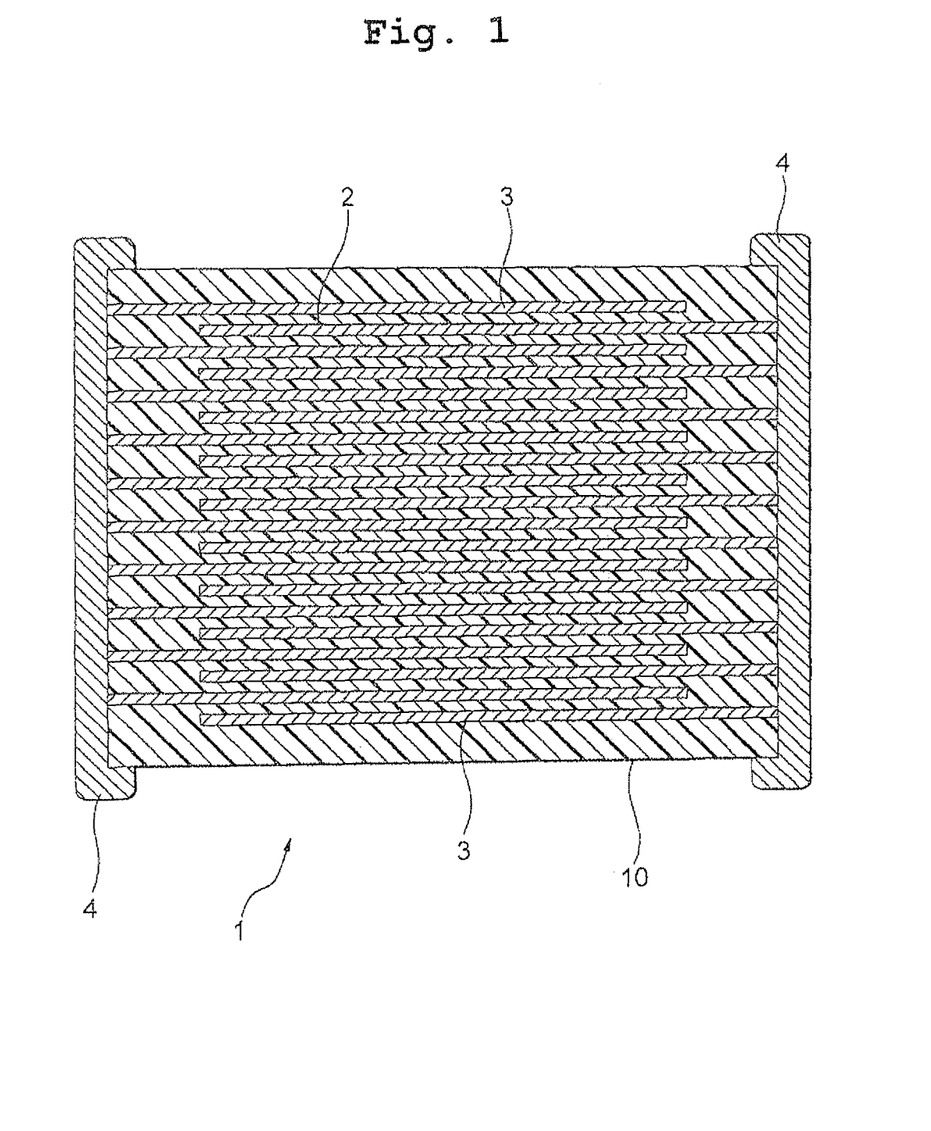
FIG. 1 is a multilayer ceramic capacitor according to one embodiment of the present invention.

As shown in FIG. 1, a multilayer ceramic capacitor 1 as a representative example of electronic components has a capacitor device body 10 wherein a dielectric layer 2 and an internal electrode layer 3 are alternately stacked. At the both end portions of the capacitor device body 10, a pair of external electrodes 4 connected with internal electrode layers 3 alternately stacked inside the device body 10, is formed. The shape of the capacitor device body 10 is not particularly limited, and is normally rectangular parallelepiped. Also, its dimension is not particularly limited, and may be properly changed as usage.

The internal electrode layers 3 are stacked so that each end face is alternately exposed to surfaces of the two opposed end portions of the capacitor device body 10. Also, the pair of external electrodes 4 is formed at both end portions of the capacitor device body 10, and connected with the exposed end faces of the alternately-stacked internal electrode layers 3 to form a capacitor circuit.

The dielectric layer 2 includes a dielectric ceramic composition according to the present embodiment. The dielectric ceramic composition according to the present embodiment has a main phase composed of hexagonal type barium titanate, and includes specific subcomponents. Note that, although compositional formulas of various oxides are shown in the following, the amount of oxygen (O) can be slightly deviate from the above stoichiometric constitution.

Firstly, it will be explained with respect to the hexagonal type barium titanate which is a main component and constitutes a main phase of the dielectric ceramic composition according to the present embodiment. The main phase composed of the hexagonal type barium titanate is formed by using following mentioned hexagonal type barium titanate powder as a source material and firing thereof with subcomponents.

(Hexagonal Type Barium Titanate Powder)

The hexagonal type barium titanate powder according to the present embodiment has barium titanate powder having hexagonal structure (hexagonal barium titanate) as a main component. Specifically, 50 wt % or more, preferably 70 wt % or more, further preferably 80 wt % or more of hexagonal barium titanate is included with respect to 100 wt % of the hexagonal type barium titanate powder according to the present embodiment.

Note that, in the hexagonal type barium titanate powder according to the present embodiment, barium titanate having tetragonal structure or cubic structure, and ortho barium titanate ($Ba_2TiO_4$)/monobarium digallium compound ($BaGa_2O_4$) may be included.

The hexagonal type barium titanate powder according to the present embodiment can be shown by using a generic formula of $(Ba_{1-\alpha}M_\alpha)_A(Ti_{1-\beta}Ga_\beta)_B O_3$.

The α in the above formula shows a substitution ratio of an element "M" with respect to Ba (content of the "M" in the hexagonal barium type titanate powder), it is $0.0015 \leq \alpha \leq 0.005$, preferably $0.003 \leq \alpha \leq 0.005$. When the content of the "M" is too little, the desired characteristics tends not to be obtained. When the content of the "M" is too large, a transformation temperature to the hexagonal structure becomes higher, thus powder having large specific surface area tends not to be obtained.

In the hexagonal structure, the Ba occupies an "A" site position as $Ba^{2+}$. However, in the present embodiment, M substitutes the Ba within the above range, and is present at the "A" site position. That is, the element M is solid dissolved in barium titanate. As M is present at "A" site position, the desired characteristics can be obtained.

The element "M" has an effective ionic radius (12-coordinated) of −25% or more to +25% or less (within ±25%) with respect to an effective ionic radius of 12-coordinated $Ba^{2+}$ (1.61 pm). The Ba can be substituted easily by "M" having such effective ionic radius.

Specifically, as for the element M, it is preferably at least one selected from Sm, Nd, Dy, Gd, Ho, Y, Er, Yb, La, Ce and Bi. The element M may be selected depending on the desired properties. Specifically, in order to exhibit high specific permittivity, it is preferably at least one selected from La, Ce, and Bi.

The β in the above formula shows a substitution ratio of Ga with respect to Ti (content of Ga in the hexagonal type barium titanate powder), it is $0.075 \leq \beta \leq 0.15$, preferably $0.075 \leq \beta \leq 0.125$, and further preferably $0.10 \leq \beta \leq 0.125$. When the content of the Ga is too small or too large, powder having large specific surface area tends not to be obtained, because a transformation temperature to hexagonal structure becomes higher.

In the hexagonal structure, although the Ti occupies a "13" site position as $Ti^{4+}$, in the present embodiment, the Ga substitutes the Ti in the above mentioned range and exists at the "B" site position. Namely, the Ga is solid-dissolved in the barium titanate. By existing the Ga at the "B" site position, the transforming temperature from tetragonal/cubic structure to the hexagonal structure in the barium titanate can be lowered.

The "A" and "B" in the above formula respectively show a ratio of elements (Ba and M) occupying the "A" site and a ratio of elements (Ti and Ga) occupying the "B" site. In the present embodiment, a ratio of (A/B) is $0.975 \leq A/B \leq 1.015$, preferably $0.985 \leq A/B \leq 1.008$.

When A/B is too small, reactivity at time of generating the barium titanate becomes high so that it will be easy to fasten particle growth with respect to temperature. Therefore, it is hard to obtain a fine particle and thus desired specific surface area tends not to be obtained.

In the present embodiment, the ratio $(\alpha/\beta)$ which is the ratio between said α and said β satisfy $(\alpha/\beta) \leq 0.005$. By setting $\alpha/\beta$ within such range, which show the ratio between the amount of element M substituted at "A" site, and the amount of Ga substituted at "B" site, the effect of the present invention can be further enhanced.

The hexagonal type barium titanate powder according to the present embodiment has the above mentioned constitution, and is produced by following specified method. Therefore, when the specific surface area immediately after producing is measured by BET method, it becomes 2 $m^2/g$ or more, preferably 3 $m^2/g$ or more, further preferably 5 $m^2/g$ or more.

As a result, for example, even in case that dielectric layer of a multilayer ceramic electronic component is made thinner (e.g., thickness of interlayer: 1 μm), a number of the barium titanate particle placed between the interlayer can be at least 2 or more so that sufficient reliability (high temperature load lifetime) can be maintained.

Note that, although the specific surface area can be increased by pulverizing the obtained powder by using a ball mill and the like, in this case, particle size distribution becomes broader. As a result, deviation of particle size is larger and deviation of reliability is larger, which is not preferable. Also, an impact (energy) and the like applied to the powder when pulverizing gives an adverse effect to the powder, which is not preferable. Therefore, it is preferable that the specific surface area thereof is larger at a condition when the hexagonal barium titanate is generated.

Note that, the effective ionic radius described in the present specification are the values based on a literature "R. D. Shannon Acta Crystallogr., A32,751(1967)".

(Producing Method of Hexagonal Type Barium Titanate Powder)

Next, a method of producing hexagonal type barium titanate powder according to the present embodiment will be explained.

First, the source material of barium titanate, the source material of the element M, and the source material of Ga are prepared.

As for the source material of the barium titanate, barium titanate ($BaTiO_3$), oxides (BaO, $TiO_2$) composing barium titanate and mixture thereof may be used. Further, it is possible to properly select from various other compounds to become the above-mentioned oxides or composite oxides by firing, for example, carbonate, oxalate, nitrate, hydroxide, organic metallic compounds, etc., to use by mixing. Specifically, as for a source material for the barium titanate, $BaTiO_3$ may be used, $BaCO_3$ and $TiO_2$ may be used. In the present embodiment, $BaCO_3$ and $TiO_2$ are preferably used.

Note that, when $BaTiO_3$ is used for the source material of the barium titanate, it may be barium titanate having tetragonal structure, barium titanate having cubic structure or barium titanate having hexagonal structure. Also, it may be mixture thereof.

Specific surface areas of the above mentioned source materials are preferably 5 to 100 $m^2/g$, more preferably 10 to 50 $m^2/g$. As for a measuring method for the specific surface area, although it is not particularly limited, for example, BET method is exemplified.

As for the source material of the element M, the compound of element M may be used, for example oxide carbonate, oxalate, nitrate, hydroxide, organic metallic compounds, etc., and it may be used by mixing thereof. The source material of Ga may be prepared as same as the source material of the element M.

Specific surface areas of these source materials are preferably 5 to 50 $m^2/g$, further preferably 10 to 20 $m^2/g$.

Next, the prepared source materials are mixed after weighing so as to be a predetermined compositional ratio, and mixture of source materials is obtained, if needed, by pulverizing. As for methods of mixing and pulverizing, for example, a wet method for mixing and pulverizing may be mentioned wherein the source materials are introduced into a conventionally known grinding container such as a ball mill and the like with solvent such as water, etc. Also, it may be mixed and pulverized by a drying method wherein a drying mixer, etc. is used. At this time, in order to improve the dispersibility of the introduced source materials, it is preferable to add a dispersing agent. As for the dispersing agent, conventionally known agent may be used.

Next, heat-treatment is performed to the obtained mixture of source materials after drying if needed. A temperature rising rate at the heat-treatment is preferably 50 to 900° C./h. Also, a holding temperature at the heat-treatment may be set as higher than a transforming temperature to a hexagonal structure. In the present embodiment, the transformation temperature is below 1460° C., and it changes depending on A/B, "A" site substitution amount (α) and "B" site substitution amount (β), etc., thus the holding temperature can be changed depending on these. In order to increase a specific surface area of the powder, for example, it is preferably set as 1100 to 1150° C. A holding time is preferably 0.5 to 3 hours, further preferably 1 to 2 hours.

As for the atmosphere of the heat-treatment, the reducing atmosphere is preferable. As for the gas under the reducing atmosphere, it is not particularly limited, however, nitrogen, argon, hydrogen, monocarboxide, and helium or so may be mentioned, and preferably it is a mixed gas of hydrogen and nitrogen, and further preferably it is nitrogen gas containing 1 to 5 vol % of hydrogen gas. The atmosphere pressure during the reduced atmosphere is $10^5$ to 10 Pa is preferable.

The hexagonal barium titanate powder substituting Ti of "B" site with Ga can be produced by the heat-treatment under atmosphere. However, by producing under the reducing atmosphere, the specific permittivity can be further improved. Also, by using such barium titanate powder, the stability during the firing multilayered ceramic capacitor comprising the internal electrodes including the base metal such as nickel or so under the reduced atmosphere is improved.

By performing such heat-treatment, Ga is solid-dissolved in $BaTiO_3$, Ti positioned at "B" site can be substituted by the Ga. As a result, the transforming temperature to the hexagonal structure can be lower than temperature at the heat-treatment, the hexagonal type barium titanate can be generated easily. Also, when the element "M" is included, the "M" is solid-dissolved in $BaTiO_3$ so as to substitute Ba at "A" site position, thereby exhibit the desired characteristics.

Note that, when the holding temperature is too low, non-reacted and/or insufficient-reacted source material (for example, $BaCO_3$ and the like) tends to be generated as a phase different from $BaTiO_3$.

Then, after passing the holding time of the heat-treatment, it is cooled from the holding temperature of the heat-treatment to room temperature so as to maintain hexagonal structure. Specifically, the cooling rate is preferably set as 200° C./h or more.

By performing this, hexagonal type barium titanate powder, which includes hexagonal barium titanate as a main component wherein hexagonal structure is maintained at room temperature, can be obtained. Although it is not particularly limited to examine as to whether the obtained powder is hexagonal type barium titanate powder or not, in the present embodiment, it is examined by X-ray diffraction method.

Firstly, it is examined as to whether a peak other than a peak originated from barium titanate (hexagonal, cubic, tetragonal, ortho barium titanate, and monobarium digallium compound) exists or not by a X-ray diffraction chart obtained by the X-ray diffraction method. If such peak exists, it is not preferable because the non-reacting product ($BaCO_3$ and the like) is generated in the obtained powder.

When the non-reacting product is not generated, it is examined by calculating a generating ratio of the hexagonal barium titanate. Specifically, a total of maximum peak intensities of hexagonal barium titanate, tetragonal barium titanate and cubic barium titanate, ortho barium titanate, and monobarium digallium compound is defined as 100%, a ratio that occupies the maximum peak intensity of the hexagonal barium titanate is defined as a generating ratio (abundance ratio) of the hexagonal barium titanate. When this ratio is 50% or more, the hexagonal type barium titanate powder which includes the hexagonal barium titanate as a main component can be obtained.

The hexagonal type barium titanate powder can be obtained by cooling from a temperature lower than a temperature at which hexagonal barium titanate stably exists normally (1460° C. or higher), thus it can be obtained as fine particle. Further, because composition and A/B ratio, etc. of the hexagonal type barium titanate are controlled within the above range, further fine particle can be obtained. Specifically, the specific surface area of the hexagonal type barium titanate according to the present embodiment is preferably 2 $m^2/g$ or more, more preferably 3 $m^2/g$ or more, further preferably 5 $m^2/g$ or more.

Note that the above mentioned specific surface area is a value when the obtained hexagonal type barium titanate powder is generated, also it has extremely sharp particle size distribution and a single peak.

By using the hexagonal type barium titanate powder obtained as such, and the subcomponents depending on the needs, the dielectric paste is produced, then the multilayered green chip is formed from the dielectric paste and the internal electrode layer paste. By firing this green chip, the electronic component comprising the dielectric layers and the internal electrode layers is produced.

(Multilayer Ceramic Capacitor)

Although a thickness of a dielectric layer 2 in a multilayer ceramic capacitor 1 shown in FIG. 1 which is a representative example of electronic components is not particularly limited, it is preferably 5 μm or less per one layer, more preferably 3 μm or less. Although a lower limit of the thickness is not particularly limited, for example, it is approximately 1 μm or so. Due to the dielectric ceramic composition according to the present embodiment, 50 or more of specific permittivity is shown with 1 μm or more of thickness. Although a number of stacked layers is not particularly limited, it is preferable 200 or more.

An average crystal particle diameter of dielectric particle included in the dielectric layer 2 is not particularly limited, it may be determined from, for example, a range of 0.1 to 1 μm, preferably 0.1 to 0.5 μm depending on the thickness of the dielectric layer 2. Note that, the average crystal particle diameter included in the dielectric layer is measured as follows. Firstly, the obtained capacitor sample is cut with a vertical plane to an internal electrode, the cut face is polished. Then, chemical etching is performed to the polished face, after this, it is observed by a scanning electron microscope (SEM), and calculated by a code method with assuming a shape of the dielectric particulate is sphere.

Although conducting material included in an internal electrode layer 3 is not particularly limited, base metals can be used because the material constituting the dielectric layer 2 has reduction to resistance. As for the base metals used for the conducting material, Ni or Ni alloy is preferable. As for the Ni alloy, an alloy of at least one kinds of element selected from Mn, Cr, Co and Al with Ni is preferable, and Ni content in the alloy is preferably 95 wt % or more.

Although conducting material included in an external electrode 4 is not particularly limited, in the present embodiment, inexpensive Ni, Cu and their alloys may be used. A thickness of the external electrode 4 may be determined depending on a purpose of use, and normally, it is preferably about 10 to 50 μm.

A multilayer ceramic capacitor in which the dielectric ceramic composition of the present embodiment is used, is produced by, as similar with a conventional multilayer ceramic capacitor, producing a green chip by a normal printing method or sheet method using a paste, then firing thereof, and firing after printing or transferring an external electrode. Below, a method of producing will be explained specifically.

Firstly, dielectric ceramic composition powder included in the dielectric layer paste is prepared. Specifically, a source material of main component and a source material of subcomponent are mixed by a ball mill and the like so that a dielectric ceramic composition powder is obtained.

As for a source material of the main component, the above mentioned hexagonal type barium titanate powder is used. As for source materials of the subcomponents, although the above mentioned oxide and mixture thereof, complex oxides thereof can be used, other than these, various kinds of compounds which becomes the above mentioned oxide and complex oxide by firing, for example, suitably selected from carbonate, oxalate, nitrate, hydroxide, organometallic compounds can be used by mixing too.

Content of the respective compounds in the obtained dielectric ceramic composition powder may be determined so that it satisfies composition of the above mentioned dielectric ceramic composition after firing.

Calcining and the like may be further performed to the above mentioned main component and subcomponents. Note that, as for the calcining condition, for example, a calcining temperature may be set as preferably 800 to 1100° C., a calcining time may be set as preferably 1 to 4 hours.

Then, the obtained dielectric ceramic composition powder is made into a paste to prepare the dielectric layer paste. The dielectric layer paste may be an organic paste kneaded with dielectric ceramic composition powder and the organic vehicle, or it may be a water-based paste.

The organic vehicle is obtained by dissolving a binder in an organic solvent. The binder used in the organic vehicle is not particularly limited, and may be properly selected from a variety of usual binders such as ethylcellulose and polyvinyl butyral or so. Also, the organic solvent used is not particularly limited, and may be properly selected from a variety of organic solvents such as terpineol, butyl carbitol, acetone and toluene in accordance with a method used such as a printing method and sheet method.

Also, when using water-based dielectric layer paste, dielectric materials can be kneaded with a water-based vehicle obtained by dissolving an aqueous binder and dispersant, etc., in water. The aqueous binder used for water-based vehicle is not particularly limited, and for example, polyvinyl alcohol, cellulose, aqueous acrylic resin, etc., may be used.

An internal electrode layer paste is obtained by kneading conducting materials consisting of the above mentioned various conducting metals and alloys, or various oxides, organic metallic compound and resinate, etc., which become the above-mentioned conducting materials after firing, with the above-mentioned organic vehicle.

An external electrode paste may be obtained as with the above-mentioned internal electrode layer paste.

The content of organic vehicle in each of the above-mentioned paste is not particularly limited, and may be usual content, for example, 1 to 5 wt % or so of the binder and 10 to 50 wt % or so of the solvent. Also, in each paste, there may be included additives selected from a variety of dispersants, plasticizer, dielectric, insulators, etc., if needed. The total contents of these are preferably 10 wt % or less.

When using the printing method, the dielectric layer paste and the internal electrode layer paste are printed on a substrate such as PET to form layers, and after cutting to a predetermined shape, a green chip is obtained by removing from the substrate.

Also, when using the sheet method, a green sheet is formed by using dielectric layer paste, internal electrode layer paste is printed thereon, and then, these are stacked to form a green chip.

Before firing, the green chip is subject to binder removal treatment. The binder removal treatment may be suitably determined depending on the type of the conducting material in the internal electrode paste. However when using base metal such as Ni or Ni alloy as the conducting material, it is preferable that oxygen partial pressure of binder removal atmosphere is set to $10^{-45}$ to $10^5$ Pa. When the oxygen partial pressure is less than the above range, binder removal effect is reduced. Also, when the oxygen partial pressure exceeds the above range, the internal electrode layer tends to oxidize.

Also, as for the binder removal condition other than this, a temperature rising rate is preferable 5 to 300° C./hr, more preferably 10 to 100° C./hr, a holding temperature is preferably 180 to 400° C., further preferably 200 to 350° C., a temperature holding time is preferably 0.5 to 24 hours, further preferably 2 to 20 hours. Also, firing atmosphere is preferably air or reducing atmospheres, as for an atmospheric gas in the reducing atmosphere, for example, a wet mixture gas of $N_2$ and $H_2$ is preferably used.

The atmosphere when firing the green chip can be suitably determined depending on the type of the conducting material in the internal electrode paste. However when using base metal such as Ni or Ni alloy as the conducting material, the oxygen partial pressure of the firing atmosphere is preferably $10^{-9}$ to $10^{-4}$ Pa. When the oxygen partial pressure is below the above range, the conducting material of the internal electrode layer may have abnormal sintering which results in a breakage thereof. Also, when the oxygen partial pressure exceeds the above range, the internal electrode layer tends to oxidize.

Also, the holding temperature at the firing is preferably 900 to 1200° C., and more preferably 1000 to 1100° C. When the holding temperature is below the above range, the densification becomes insufficient; and when it exceeds the above range, the breakage of the electrode due to the abnormal sinter of the internal electrode layer, the deterioration of the capacitance-temperature characteristics due to the dispersion of the constitution material of the internal electrode layer, or a reduction of the dielectric ceramic composition tend to occur.

As for other firing condition other than the above, a temperature rising rate is preferably 50 to 500° C./hour, more preferably 200 to 300° C./hour, a temperature holding time is preferably 0.5 to 8 hours, more preferably 1 to 3 hours, a cooling rate is preferably 50 to 500° C./hour, more preferably 200 to 300° C./hour. Also, firing atmosphere is preferably reducing atmosphere, as for an atmospheric gas in the reducing atmosphere, for example, a wet mixture gas of $N_2$ and $H_2$ is preferably used.

After firing in a reducing atmosphere, it is preferable to anneal the capacitor device body. The annealing is a treatment for reoxidizing the dielectric layer and can make IR lifetime significantly longer, so that the reliability is improved.

The oxygen partial pressure in the annealing atmosphere is preferably $10^{-3}$ Pa or more, particularly preferably $10^{-2}$ to 10 Pa. When the oxygen partial pressure is below the above range, it may be difficult to reoxidize the dielectric layer. When it exceeds the above range, the internal electrode layer tends to be oxidized.

Holding temperature at annealing is preferably 1100° C. or less, particularly preferably 500 to 900° C. When the holding temperature is below the above range, the dielectric layer may not be sufficiently oxidized, often resulting in lowering IR and shortening IR lifetime. On the other hand, when the holding temperature exceeds the above range, the internal electrode layer is not only oxidized to reduce the capacitance, but also reacts with the dielectric body, which may easily cause deteriorated capacitance-temperature characteristics, reduced IR, and reduction in IR lifetime. Note that the annealing may consist of a temperature rising process and temperature cooling process. Namely, the temperature holding time may be zero. In this case, the holding temperature is same as the maximum temperature.

As for other annealing conditions other than the above, the temperature holding time is preferably 0 to 20 hours, more preferably 2 to 10 hours, and the cooling rate is preferably 50 to 500° C./hour, more preferably 100 to 300° C./hour. Also, the atmosphere gas at annealing is preferably a wet $N_2$ gas, for example.

In the above-mentioned binder removal treatment, firing and annealing, a wetter, etc., may be used to wet the $N_2$ gas and mixed gas, for example. In this case, the water temperature is preferably 5 to 75° C. or so.

The binder removal treatment, firing and annealing may be performed continuously or independently.

An end face polishing is conducted to a capacitor body obtained as the above, for example by barrel polishing or sandblast, an external electrode paste is printed or transferred and fired so that an external electrode 4 is formed. A firing condition of the external electrode paste is preferably, for example, about 10 minutes to 1 hour at 600 to 800° C. in wet mixture gas of $N_2$ and $H_2$. Then, if needed, a coating layer is formed on a surface of the external electrode 4 by plating and the like.

The multilayer ceramic capacitor of the present invention produced according to the above is used for various electronic components and the like by mounting on a printed-circuit board and the like by soldering and the like.

The foregoing has described embodiment of the present invention, however, the present invention is not limited to the above mentioned embodiment at all, and various modification can be made within a scope of the present invention.

For example, in the above-mentioned embodiment, a multilayer ceramic capacitor is exemplified as an electronic device according to the present invention. However, the electronic device according to the present invention is not limited to the multilayer ceramic capacitor and may be any comprising the dielectric layer having the above composition. Also, in the above mentioned embodiment, although the hexagonal type barium titanate powder according to the present invention is produced by so called a solid phase method, it may be produced by oxalate method, sol-gel method and the like.

EXAMPLES

Hereinafter, the present invention will be described based on the detailed examples, however the present invention is not to be limited thereto.

Experimental Example 1

(Preparation of Hexagonal Type Barium Titanate Powder)

At first, $BaCO_3$ (specific surface area: 25 $m^2/g$) and $TiO_2$ (specific surface area: 50 $m^2/g$) were prepared as source materials of barium titanate. Also, $La(OH)_3$ (specific surface area: 10 $m^2/g$) was prepared as a source material of the element "M", and $Ga_2O_3$ (specific area 15 $m^2/g$) was prepared as the source material of Ga.

These source materials were weighed so that "α", "β", "A/B" in a generic formula of $(Ba_{1-\alpha}M_\alpha)_A(Ti_{1-\beta}Ga_\beta)_BO_3$ satisfy the values shown in Table 1 respectively and mixed with water and dispersing agent by a ball-mill. The obtained mixed powder was heat-treated under following mentioned heat-treatment condition so that hexagonal type barium titanate powder was produced.

The heat-treatment condition was that temperature rising rate: 200° C./hr, holding temperature: temperature shown in Table 1, temperature holding time: 2 hours, cooling rate: 200° C./hr, atmospheric gas: reducing atmosphere of nitrogen+hydrogen (3 volume %).

Following mentioned X-ray diffraction was performed to the obtained hexagonal type barium titanate powder. Also, a specific surface area was measured by BET method. Results of the specific surface area are shown in Table 3.

(X-ray Diffraction)

For the X-ray diffraction, Cu—Kα ray was used as a X-ray source, measuring condition thereof was 45 kV voltage, 2θ=20° to 90° with electric current 40 mA, scanning speed of 0.02 deg/min, elapsed time of 30 seconds.

Figure 2A:
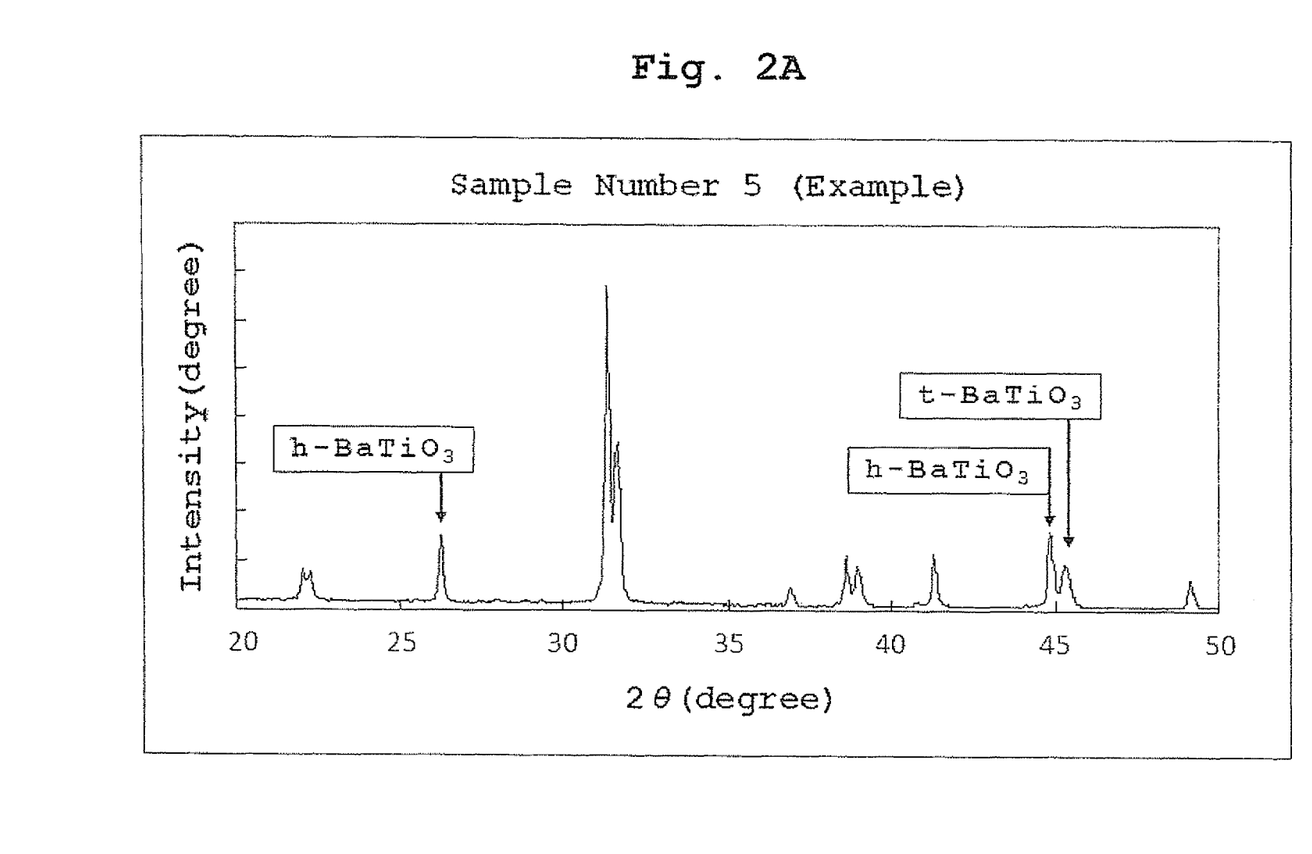
FIG. 2A and FIG. 2B are X-ray diffraction chart of samples of examples and comparative examples according to the present invention.
Figure 2B:
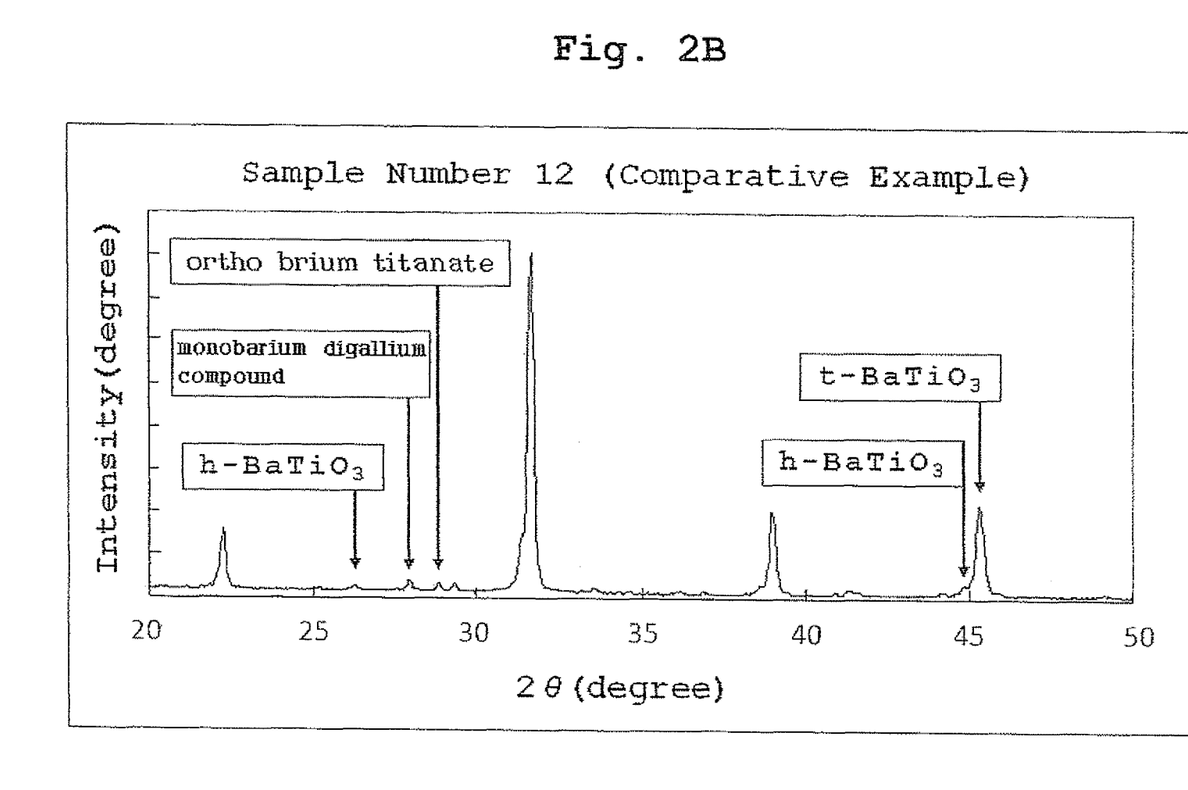

From X-ray diffraction chart obtained by the measurement, identifying respective peaks near 2θ=45°, evaluation was made as to whether barium titanate (hexagonal, tetragonal, cubic) and phase different from barium titanate exist. Results are shown in Table 1. The X-ray diffraction chart with respect to sample numbers 5 and 12 are shown in FIG. 2A and FIG. 2B.

Figure 3:
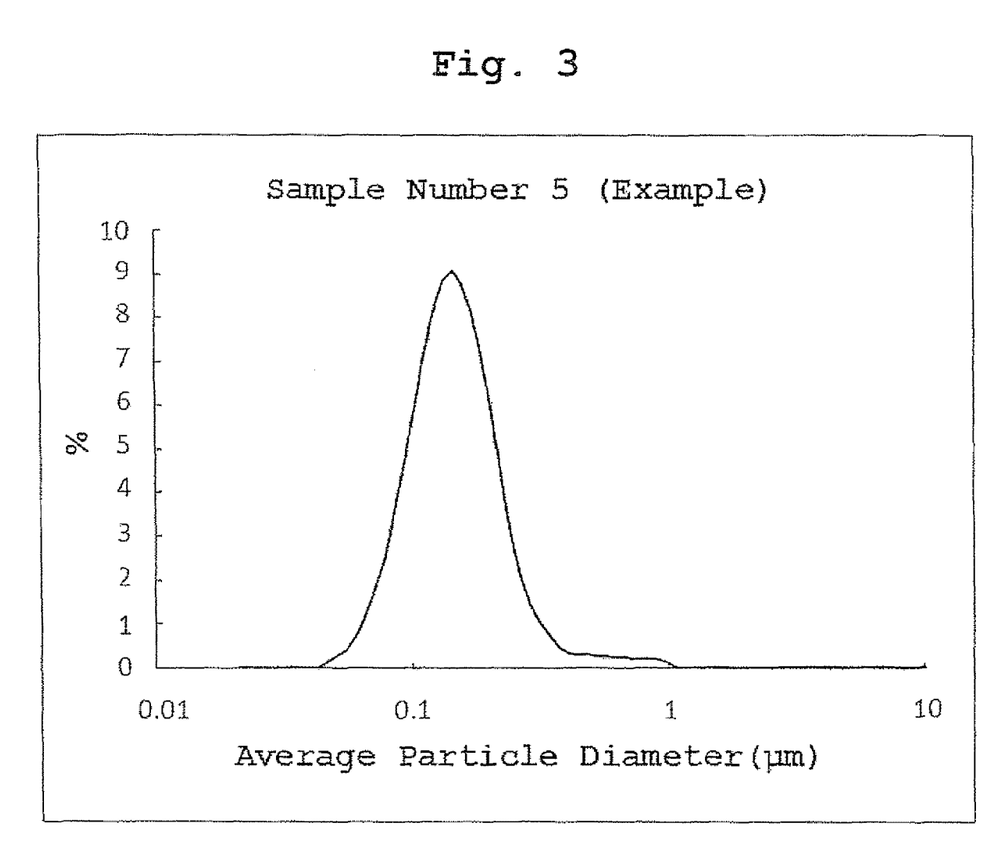
FIG. 3 is a graph showing particle size distribution of samples of examples and comparative examples according to the present invention.

Also, the particle distribution in regards with the sample number 5 (example) is shown in FIG. 3. As shown in FIG. 3, it can be confirmed in the samples of the examples that sharp particle distribution can be obtained.

Next, with respect to samples wherein only peak of barium titanate was observed, maximum peak intensities of hexagonal barium titanate (h-$BaTiO_3$), tetragonal barium titanate (t-$BaTiO_3$), cubic barium titanate (c-$BaTiO_3$), ortho barium titanate/monobarium digallium compound were calculated. Then, an occupied ratio of the maximum peak intensity of h-$BaTiO_3$ to a total of maximum peak intensities of h-$BaTiO_3$, t-$BaTiO_3$, c-$BaTiO_3$ and ortho barium titanate/monobarium digallium compound were calculated so that a ratio of hexagonal barium titanate (h-$BaTiO_3$) was evaluated. Results of the obtained rate were shown in Table 2.

TABLE 1

| | $(Ba_{1-\alpha}La_\alpha)_A(Ti_{1-\beta}Ga_\beta)_BO_3$ | | | | | | | |
|---|---|---|---|---|---|---|---|---|
| | "A" site substitution | "B" site substitution | | Identified phase by X-ray diffraction Heat-treatment temperature | | | | |
| Sample numbers | amount α | amount β | A/B | 1000° C. | 1050° C. | 1100° C. | 1150° C. | 1200° C. |
| 1 | 0.003 | 0.1 | 0.95 | NG | NG | NG | NG | NG |
| 2 | 0.003 | 0.1 | 0.975 | NG | NG | Mixed phase | Mixed phase | Mixed phase |
| 3 | 0.003 | 0.1 | 0.985 | NG | Mixed phase | Mixed phase | Mixed phase | Mixed phase |
| 4 | 0.003 | 0.1 | 0.995 | NG | Mixed phase | Mixed phase | Mixed phase | Mixed phase |
| 5 | 0.003 | 0.1 | 1.000 | NG | Mixed phase | Mixed phase | Mixed phase | Mixed phase |
| 6 | 0.003 | 0.1 | 1.008 | NG | Mixed phase | Mixed phase | Mixed phase | Mixed phase |

TABLE 1-continued

| | $(Ba_{1-\alpha}La_\alpha)_A(Ti_{1-\beta}Ga_\beta)_BO_3$ | | | Identified phase by X-ray diffraction Heat-treatment temperature | | | | |
|---|---|---|---|---|---|---|---|---|
| Sample numbers | "A" site substitution amount α | "B" site substitution amount β | A/B | 1000° C. | 1050° C. | 1100° C. | 1150° C. | 1200° C. |
| 7 | 0.003 | 0.1 | 1.015 | NG | Mixed phase | Mixed phase | Mixed phase | Mixed phase |
| 8 | 0 | 0.1 | 1.000 | NG | Mixed phase | Mixed phase | Mixed phase | Mixed phase |
| 9 | 0.0015 | 0.1 | 1.000 | NG | Mixed phase | Mixed phase | Mixed phase | Mixed phase |
| 5 | 0.003 | 0.1 | 1.000 | NG | Mixed phase | Mixed phase | Mixed phase | Mixed phase |
| 10 | 0.005 | 0.1 | 1.000 | NG | Mixed phase | Mixed phase | Mixed phase | Mixed phase |
| 11 | 0.01 | 0.1 | 1.000 | NG | NG | NG | Mixed phase | Mixed phase |
| 12 | 0.03 | 0.1 | 1.000 | NG | NG | NG | NG | NG |
| 13 | 0.003 | 0.025 | 1.000 | NG | NG | NG | NG | NG |
| 14 | 0.003 | 0.05 | 1.000 | NG | NG | NG | NG | Mixed phase |
| 15 | 0.003 | 0.075 | 1.000 | NG | NG | Mixed phase | Mixed phase | Mixed phase |
| 5 | 0.003 | 0.1 | 1.000 | NG | Mixed phase | Mixed phase | Mixed phase | Mixed phase |
| 16 | 0.003 | 0.125 | 1.000 | NG | Mixed phase | Mixed phase | Mixed phase | Mixed phase |
| 17 | 0.003 | 0.15 | 1.000 | NG | Mixed phase | Mixed phase | Mixed phase | Mixed phase |
| 18 | 0.003 | 0.2 | 1.000 | NG | Mixed phase | Mixed phase | Mixed phase | Mixed phase |
| 19 | 0 | Mn 0.14 | 1.008 | NG | NG | NG | NG | NG |
| 20 | 0.003 | Mn 0.14 | 1.008 | NG | NG | NG | NG | NG |

Mixed phase shows that 2 or more phase are identified among h-BT, t-BT, c-BT, ortho barium titanate/monobarium digallium compounds

TABLE 2

| | $(Ba_{1-\alpha}La_\alpha)_A(Ti_{1-\beta}Ga_\beta)_BO_3$ | | | Generation rate (%) of h-BaTiO$_3$ Heat-treatment temperature | | | | |
|---|---|---|---|---|---|---|---|---|
| Sample numbers | "A" site substitution amount α | "B" site substitution amount β | A/B | 1000° C. | 1050° C. | 1100° C. | 1150° C. | 1200° C. |
| 1 | 0.003 | 0.1 | 0.95 | — | — | — | — | — |
| 2 | 0.003 | 0.1 | 0.975 | — | — | 54.0 | 72.1 | 78.3 |
| 3 | 0.003 | 0.1 | 0.985 | — | 11.5 | 56.7 | 75.4 | 79.1 |
| 4 | 0.003 | 0.1 | 0.995 | — | 14.3 | 61.4 | 77.8 | 80.2 |
| 5 | 0.003 | 0.1 | 1.000 | — | 14.6 | 62.4 | 79.3 | 81.5 |
| 6 | 0.003 | 0.1 | 1.008 | — | 13.2 | 60.9 | 73.5 | 77.8 |
| 7 | 0.003 | 0.1 | 1.015 | — | 12.2 | 60.2 | 70.1 | 76.6 |
| 8 | 0 | 0.1 | 1.000 | — | 20.8 | 95.6 | 96.4 | 96.9 |
| 9 | 0.0015 | 0.1 | 1.000 | — | 15.1 | 80.6 | 88.5 | 91.2 |
| 5 | 0.003 | 0.1 | 1.000 | — | 14.6 | 62.4 | 79.3 | 81.5 |
| 10 | 0.005 | 0.1 | 1.000 | — | — | 60.1 | 75.7 | 76.8 |
| 11 | 0.01 | 0.1 | 1.000 | — | — | — | 34.2 | 67.4 |
| 12 | 0.03 | 0.1 | 1.000 | — | — | — | — | — |
| 13 | 0.003 | 0.025 | 1.000 | — | — | — | — | — |
| 14 | 0.003 | 0.05 | 1.000 | — | — | — | — | 12.8 |
| 15 | 0.003 | 0.075 | 1.000 | — | — | 52.7 | 60.1 | 74.3 |
| 5 | 0.003 | 0.1 | 1.000 | — | 14.6 | 62.4 | 79.3 | 81.5 |
| 16 | 0.003 | 0.125 | 1.000 | — | 14.2 | 60.1 | 76.9 | 85.6 |
| 17 | 0.003 | 0.15 | 1.000 | — | 12.8 | 57.3 | 71.8 | 82.2 |
| 18 | 0.003 | 0.2 | 1.000 | — | 8.4 | 47.8 | 68.5 | 75.9 |
| 19 | 0 | Mn 0.14 | 1.008 | — | — | — | — | — |
| 20 | 0.003 | Mn 0.14 | 1.008 | — | — | — | — | — |

TABLE 3

| | $(Ba_{1-\alpha}La_\alpha)_A(Ti_{1-\beta}Ga_\beta)_BO_3$ | | | Specific surfacfe area of the obtained powder (m$^2$/g) Heat-treatment temperature | | | | |
|---|---|---|---|---|---|---|---|---|
| Sample numbers | "A" site substitution amount α | "B" site substitution amount β | A/B | 1000° C. | 1050° C. | 1100° C. | 1150° C. | 1200° C. |
| 1 | 0.003 | 0.1 | 0.95 | — | — | — | — | — |
| 2 | 0.003 | 0.1 | 0.975 | — | — | 2.5 | 0.2 | non-measurable |
| 3 | 0.003 | 0.1 | 0.985 | — | 5.8 | 3.2 | 0.9 | non-measurable |
| 4 | 0.003 | 0.1 | 0.995 | — | 6.4 | 3.9 | 1.2 | non-measurable |
| 5 | 0.003 | 0.1 | 1.000 | — | 6.8 | 4.2 | 1.2 | non-measurable |

TABLE 3-continued

| | $(Ba_{1-\alpha}La_\alpha)_A(Ti_{1-\beta}Ga_\beta)_BO_3$ | | | | | | | |
|---|---|---|---|---|---|---|---|---|
| | "A" site substitution | "B" site substitution | | Specific surfacfe area of the obtained powder (m²/g) Heat-treatment temperature | | | | |
| Sample numbers | amount α | amount β | A/B | 1000° C. | 1050° C. | 1100° C. | 1150° C. | 1200° C. |
| 6 | 0.003 | 0.1 | 1.008 | — | 6.2 | 3.6 | 0.3 | non-measurable |
| 7 | 0.003 | 0.1 | 1.015 | — | 6.0 | 3.3 | non-measurable | non-measurable |
| 8 | 0 | 0.1 | 1.000 | — | 5.7 | 3.4 | 0.6 | non-measurable |
| 9 | 0.0015 | 0.1 | 1.000 | — | 6.4 | 3.9 | 0.9 | non-measurable |
| 5 | 0.003 | 0.1 | 1.000 | — | 6.8 | 4.2 | 1.2 | non-measurable |
| 10 | 0.005 | 0.1 | 1.000 | — | — | 4.2 | 2.0 | non-measurable |
| 11 | 0.01 | 0.1 | 1.000 | — | — | — | 2.1 | non-measurable |
| 12 | 0.03 | 0.1 | 1.000 | — | — | — | — | — |
| 13 | 0.003 | 0.025 | 1.000 | — | — | — | — | — |
| 14 | 0.003 | 0.05 | 1.000 | — | — | — | — | non-measurable |
| 15 | 0.003 | 0.075 | 1.000 | — | — | 4.4 | 2.3 | non-measurable |
| 5 | 0.003 | 0.1 | 1.000 | — | 6.8 | 4.2 | 1.2 | non-measurable |
| 16 | 0.003 | 0.125 | 1.000 | — | 6.3 | 2.8 | 0.2 | non-measurable |
| 17 | 0.003 | 0.15 | 1.000 | — | 5.9 | 2.3 | non-measurable | non-measurable |
| 18 | 0.003 | 0.2 | 1.000 | — | 5.1 | 1.2 | non-measurable | non-measurable |
| 19 | 0 | Mn 0.14 | 1.008 | — | — | — | — | — |
| 20 | 0.003 | Mn 0.14 | 1.008 | — | — | — | — | — |

From FIG. 2A and FIG. 2B, in the sample number 5, h-BaTiO₃, t-BaTiO₃, c-BaTiO₃, ortho barium titanate and monobarium digallium compound were confirmed. Note that, t-BaTiO₃ and c-BaTiO₃ are not distinguished because their peaks are close.

In contrast, in the sample number 12 (comparative example), from the peak intensity near 2θ=26°, it was confirmed that the generation rate of h-BaTiO₃ was 50% or less.

From Table 1, when the "A" site substitution amount is too large, the rate of h-BaTiO₃ declines, as shown in FIG. 2B, thus it was confirmed that it tends to become unfavorable.

When A/B is too small, and also when the "B" site substitution amount is too little, the rate of h-BaTiO₃ is small, and thus it was confirmed that it tends to become unfavorable.

In Table 2, samples to which h-BaTiO₃ generating rate was not measured were shown by diagonal line. From Table 2, when the "A" site substitution amount is larger, or the "B" site substitution amount is too low, h-BaTiO₃ generating rate becomes lower, thus it was confirmed undesirable tendency.

From Table 2 and Table 3, it was confirmed that the hexagonal barium titanate having a high h-BaTiO₃ generating rate and the specific surface area of 2 m²/g or more can be obtained by setting "A" site substitution amount and "B" site substitution amount within the range of the present invention, and by suitably controlling the heat-treating temperature.

In Table 1 to 3, as the comparative example, in stead of using Ga, Mn is used for the substitution in β=0.14, and also α=0 or 0.003. Other than that, the powder was produced as same as the sample number 6 and the results are shown in the sample numbers 19 and 20. The Mn substitution is different from Ga substitution, and it was confirmed that the hexagonal barium titanate powder having the specific surface area of 2m²/g or more cannot be obtained under the reducing atmosphere at 1200° C. or lower.

Experimental Example 2

Except for using oxides, carbonate and hydroxide of elements shown in Table 4 as a source material of the element "M" instead of La(OH)₃, a powder was produced as similar with the experimental example 1, a specific surface area was measured and X-ray diffraction measurement was performed. Results are shown in Tables 4 to 6.

TABLE 4

| | $(Ba_{1-\alpha}M_\alpha)_A(Ti_{1-\beta}Ga_\beta)_BO_3$ | | | | Identified phase by X-ray diffraction | | | | |
|---|---|---|---|---|---|---|---|---|---|
| | "A" site | | "B" site | | | | | | |
| Sample | | substitution | substitution | | Heat-treatment temperature | | | | |
| numbers | Element M | amount α | amount β | A/B | 1000° C. | 1050° C. | 1100° C. | 1150° C. | 1200° C. |
| 5 | La | 0.003 | 0.1 | 1.000 | NG | Mixed phase | Mixed phase | Mixed phase | Mixed phase |
| 25 | Nd | 0.003 | 0.1 | 1.000 | NG | Mixed phase | Mixed phase | Mixed phase | Mixed phase |
| 26 | Sm | 0.003 | 0.1 | 1.000 | NG | Mixed phase | Mixed phase | Mixed phase | Mixed phase |
| 27 | Dy | 0.003 | 0.1 | 1.000 | NG | Mixed phase | Mixed phase | Mixed phase | Mixed phase |
| 28 | Gd | 0.003 | 0.1 | 1.000 | NG | Mixed phase | Mixed phase | Mixed phase | Mixed phase |
| 29 | Ho | 0.003 | 0.1 | 1.000 | NG | Mixed phase | Mixed phase | Mixed phase | Mixed phase |
| 30 | Y | 0.003 | 0.1 | 1.000 | NG | Mixed phase | Mixed phase | Mixed phase | Mixed phase |
| 31 | Er | 0.003 | 0.1 | 1.000 | NG | Mixed phase | Mixed phase | Mixed phase | Mixed phase |
| 32 | Yb | 0.003 | 0.1 | 1.000 | NG | Mixed phase | Mixed phase | Mixed phase | Mixed phase |
| 33 | Ce | 0.003 | 0.1 | 1.000 | NG | Mixed phase | Mixed phase | Mixed phase | Mixed phase |
| 34 | Bi | 0.003 | 0.1 | 1.000 | NG | Mixed phase | Mixed phase | Mixed phase | Mixed phase |

Mixed phase shows that 2 or more phase are indentified among h-BT, t-BT, c-BT, ortho barium titanate/monobarium digallium compounds

TABLE 5

| Sample numbers | $(Ba_{1-\alpha}M_\alpha)_A(Ti_{1-\beta}Ga_\beta)_BO_3$ | | | | Generation rate (%) of h-BaTiO$_3$ | | | | |
| | "A" site | | "B" site | | Heat-treatment temperature | | | | |
| | Element M | substitution amount α | substitution amount β | A/B | 1000° C. | 1050° C. | 1100° C. | 1150° C. | 1200° C. |
|---|---|---|---|---|---|---|---|---|---|
| 5  | La | 0.003 | 0.1 | 1.000 | — | 14.6 | 62.4 | 79.3 | 81.5 |
| 25 | Nd | 0.003 | 0.1 | 1.000 | — | 13.8 | 60.5 | 75.7 | 77.5 |
| 26 | Sm | 0.003 | 0.1 | 1.000 | — | 13.5 | 61.2 | 76.7 | 78.6 |
| 27 | Dy | 0.003 | 0.1 | 1.000 | — | 14.3 | 61.9 | 79.0 | 80.6 |
| 28 | Gd | 0.003 | 0.1 | 1.000 | — | 15.1 | 63.1 | 77.9 | 79.8 |
| 29 | Ho | 0.003 | 0.1 | 1.000 | — | 13.7 | 62.5 | 79.1 | 80.6 |
| 30 | Y  | 0.003 | 0.1 | 1.000 | — | 13.9 | 59.9 | 75.3 | 77.2 |
| 31 | Er | 0.003 | 0.1 | 1.000 | — | 14.2 | 60.8 | 76.5 | 78.4 |
| 32 | Yb | 0.003 | 0.1 | 1.000 | — | 14.9 | 63.1 | 80.1 | 93.1 |
| 33 | Ce | 0.003 | 0.1 | 1.000 | — | 15.9 | 62.9 | 78.5 | 80.1 |
| 34 | Bi | 0.003 | 0.1 | 1.000 | — | 13.8 | 61.5 | 77.3 | 78.8 |

TABLE 6

| Sample numbers | $(Ba_{1-\alpha}M_\alpha)_A(Ti_{1-\beta}Ga_\beta)_BO_3$ | | | | Specific surfacfe area of the obtained powder (m$^2$/g) | | | | |
| | "A" site | | "B" site | | Heat-treatment temperature | | | | |
| | Element M | substitution amount α | substitution amount β | A/B | 1000° C. | 1050° C. | 1100° C. | 1150° C. | 1200° C. |
|---|---|---|---|---|---|---|---|---|---|
| 5  | La | 0.003 | 0.1 | 1.000 | — | 6.8 | 4.2 | 1.2 | non-measurable |
| 25 | Nd | 0.003 | 0.1 | 1.000 | — | 6.8 | 4.4 | 1.3 | non-measurable |
| 26 | Sm | 0.003 | 0.1 | 1.000 | — | 6.9 | 4.3 | 1.2 | non-measurable |
| 27 | Dy | 0.003 | 0.1 | 1.000 | — | 6.8 | 4.1 | 1.1 | non-measurable |
| 28 | Gd | 0.003 | 0.1 | 1.000 | — | 6.9 | 4.3 | 1.4 | non-measurable |
| 29 | Ho | 0.003 | 0.1 | 1.000 | — | 6.8 | 4.5 | 1.3 | non-measurable |
| 30 | Y  | 0.003 | 0.1 | 1.000 | — | 6.5 | 4.4 | 1.2 | non-measurable |
| 31 | Er | 0.003 | 0.1 | 1.000 | — | 7.2 | 4.2 | 1.4 | non-measurable |
| 32 | Yb | 0.003 | 0.1 | 1.000 | — | 6.7 | 4.2 | 1.0 | non-measurable |
| 33 | Ce | 0.003 | 0.1 | 1.000 | — | 6.6 | 4.0 | 1.1 | non-measurable |
| 34 | Bi | 0.003 | 0.1 | 1.000 | — | 7.1 | 4.3 | 1.3 | non-measurable |

From the above, it was confirmed that the hexagonal type barium titanate powder according to the present invention includes the hexagonal barium titanate as a main component and that the specific surface area thereof is 2 m$^2$/g or more and thus particle size distribution thereof is narrow.

Experimental Example 3

Among the hexagonal type barium titanate according to the present invention produced by the experimental example 1 and Table 4, the dielectric powder heat-treated at 1100° C. (the sample numbers 1, 2, 5, 8 to 11, 14, 15, 17, 18, 25 to 34) were prepared. To these dielectric powder: 100 wt %, polyvinyl alcohol solution: 10 wt % was added, and was granulated, then passed through the mesh pass. Then, the obtained granulated powder was molded at the pressure of 30 Pa, thereby the disk shape green mold having the diameter of 12 mm and the thickness of 1 mm was obtained.

Next, by firing the obtained green mold in nitrogen+hydrogen (3 volume %) atmosphere at 1300° C. for 2 hours, the sintered body having a disk shape was obtained. Then, indium gallium electrode was pasted on the surface of the obtained sintered body, and by carrying out the baking treatment, the ceramic capacitor sample having the disk shape was obtained.

The dielectric layer 10 of the obtained capacitor sample was about 0.6 mm. Further, in regards with the obtained each ceramic capacitor (sample numbers 1a, 2a, 5a, 8a to 11a, 14a, 15a, 17a, 18a, 25a to 34a), "specific permittivity ∈", "insulance resistance", and "dielectric loss tan δ" were measured based on the following methods.

(Specific Permittivity ∈, Insulation Resistance, and Dielectric Loss Tan δ)

A capacitance "C" was measured to a capacitor sample, under a criterion temperature 20° C., a frequency 1 kHz, an input signal level (measured voltage) 0.5 Vrms/μm was inputted by a digital LCR meter (YHP4274A made by Yokogawa Electric Corp.). Then, the specific permittivity (no unit) was calculated based on the obtained capacitance, a thickness of the dielectric body of the multilayer ceramic capacitor and overlapping area of each internal electrode.

Then, insulation resistance IR was measured after applying 50V of DC during 60 seconds at 25° C. to the capacitor sample by using an insulation resistance meter (R8340A made by Advantest Corp.).

The dielectric loss (tan δ) was measured against the capacitor sample at 25° C. using a digital LCR meter (YHP4274A made by Yokogawa Electric Corp.) under the condition of a frequency 1kHz, an input signal level 0.5 Vrms/μm.

TABLE 7

| Sample numbers | "A" site Element M | "A" site substitution amount α | "B" site substitution amount β | A/B | Generation rate(%) of h-BaTIO$_3$ (1100° C.) | Specific surface area (m$^2$/g) of the obtained powder (1100° C.) | ε | tanδ (%) | Insulation resistance (Ω) |
|---|---|---|---|---|---|---|---|---|---|
| 8a | La | 0.0000 | 0.100 | 1.000 | 95.6 | 3.4 | 5272 | 1.2 | 4.19E+10 |
| 9a | La | 0.0015 | 0.100 | 1.000 | 80.6 | 3.9 | 89043 | 6.2 | 8.55E+07 |
| 5a | La | 0.0030 | 0.100 | 1.000 | 62.4 | 4.2 | 235677 | 6 | 9.87E+07 |
| 10a | La | 0.0050 | 0.100 | 1.000 | 60.1 | 4.2 | 132590 | 7.3 | 8.30E+07 |
| 11a | La | 0.0100 | 0.100 | 1.000 | — | — | 15304 | 24.8 | 1.88E+05 |
| 14a | La | 0.0030 | 0.050 | 1.000 | — | — | — | 40.1 | 5.92E+03 |
| 15a | La | 0.0030 | 0.075 | 1.000 | 52.7 | 4.4 | 190589 | 6.3 | 8.97E+07 |
| 17a | La | 0.0030 | 0.150 | 1.000 | 57.3 | 2.3 | 103487 | 6.5 | 8.97E+07 |
| 18a | La | 0.0030 | 0.200 | 1.000 | 47.8 | 1.2 | 8422 | 4.8 | 4.35E+08 |
| 1a | La | 0.0030 | 0.100 | 0.950 | — | — | — | 48.6 | 3.91E+03 |
| 2a | La | 0.0030 | 0.100 | 0.975 | 54.0 | 2.5 | 197423 | 9.8 | 9.13E+07 |
| 7a | La | 0.0030 | 0.100 | 1.015 | 60.2 | 3.3 | 185983 | 6.1 | 9.33E+07 |
| 25a | Nd | 0.0030 | 0.100 | 1.000 | 60.5 | 4.4 | 58930 | 7.1 | 9.21E+07 |
| 26a | Sm | 0.0030 | 0.100 | 1.000 | 61.2 | 4.3 | 104487 | 6.5 | 8.91E+07 |
| 27a | Dy | 0.0030 | 0.100 | 1.000 | 61.9 | 4.1 | 90034 | 6.5 | 9.25E+07 |
| 28a | Gd | 0.0030 | 0.100 | 1.000 | 63.1 | 4.3 | 104723 | 6.7 | 8.98E+07 |
| 29a | Ho | 0.0030 | 0.100 | 1.000 | 62.5 | 4.5 | 135829 | 6 | 9.56E+07 |
| 30a | Y | 0.0030 | 0.100 | 1.000 | 59.9 | 4.4 | 94733 | 7.3 | 9.34E+07 |
| 31a | Er | 0.0030 | 0.100 | 1.000 | 60.8 | 4.2 | 116436 | 6.3 | 8.30E+07 |
| 32a | Yb | 0.0030 | 0.100 | 1.000 | 63.1 | 4.2 | 99576 | 6.5 | 8.97E+07 |
| 33a | Ce | 0.0030 | 0.100 | 1.000 | 62.9 | 4.0 | 204367 | 7.3 | 8.97E+07 |
| 34a | Bi | 0.0030 | 0.100 | 1.000 | 61.5 | 4.3 | 210588 | 8.2 | 8.14E+07 |
| 35a | La | 0.0030 | 0.100 | 1.000 | 70.1 | 3.6 | 28772 | 5.1 | 7.81E+08 |

From Table 7, it was confirmed that when the composition of the dielectric ceramic composition is within the range of the present invention (the sample numbers 5a, 9a, 10a, 15a, 17a, 2a, 7a, 25a to 34a), the specific permittivity ∈ is 50,000 or more, tan δ is 10% or less, and the insulation resistance is $10^7 \Omega$ thus the reliability is improved.

On the other hand, it is confirmed that when the composition of the dielectric ceramic composition is out of the range of the present invention (the sample number 8a, 11a, 14a, 18a, 1a), at least one of the specific permittivity, the dielectric loss (1 kHz, 100 kHz), the insulation resistance, h-BT purification rate, the specific surface area are deteriorated.

Note that, the sample number 35a in Table 7 is not in the reducing atmosphere, the heat-treatment was carried out in the atmosphere. Other than that, the capacitor sample was produced as same as the sample number 5, and the results of the same evaluations are shown. As shown in Table 7, when the heat-treatment is carried out in the atmosphere, the example (the sample number 35a) exhibit better properties compared to the capacitor samples of the sample numbers 8a, 11 a, 14a, 18a, 1 a as the comparative examples. Note that it was also confirmed that it is preferable to heat-treat under the reducing atmosphere rather than the atmosphere by comparing against the examples of sample numbers 5a, 9a, 10a, 15a, 17a, 2a, 7a, 25a to 34a which are heat-treated under reduced atmosphere.

From the above, according to the dielectric ceramic composition having the hexagonal type barium titanate of the present invention as a main phase, electronic components such as a ceramic capacitor showing comparatively high specific permittivity, having advantageous insulation resistance and having sufficient reliability are obtained.

The invention claimed is:

1. A hexagonal type barium titanate powder comprising barium titanate as a main component shown by a generic formula of $(Ba_{1-\alpha}M_\alpha)_A(Ti_{1-\beta}Ga_\beta)_B O_3$ and having hexagonal structure wherein;
    an effective ionic radius of 12-coordinated "M" is −25% or more to +25% or less with respect to an effective ionic radius of 12-coordinated $Ba^{2+}$, and
    said A, B, α and β satisfy relations of 0.975≤(A/B)≤1.015, 0.0015≤α<0.005, 0.075≤β≤0.15.

2. A method of producing the hexagonal type barium titanate powder as set forth in claim 1 comprising steps of;
    preparing a source material of barium titanate, a source material of an element M, and a source material of Ga,
    heat-treating said source material of barium titanate, said source material of an element M, and said source material of Ga.

3. A dielectric ceramic composition comprising a hexagonal type barium titanate powder as a main component shown by a generic formula of $(Ba_{1-\alpha}M_\alpha)_A(Ti_{1-\beta}Ga_\beta)_B O_3$ and having hexagonal structure wherein;
    an effective ionic radius of 12-coordinated "M" is −25% or more to +25% or less with respect to an effective ionic radius of 12-coordinated $Ba^{2+}$, and
    said A, B, α and β satisfy relations of 0.975≤(A/B)≤1.015, 0.0015≤α<0.005, 0.075≤β≤0.15.

4. An electronic component comprising a dielectric layer constituted from the dielectric ceramic composition as set forth in claim 3.

5. A method of producing an electronic component comprising the steps of,
    forming a dielectric paste layer using a dielectric paste including a hexagonal barium titanate powder as set forth in claim 1, and
    firing said dielectric paste layer.

* * * * *